US009776531B2

(12) United States Patent
Kim et al.

(10) Patent No.: US 9,776,531 B2
(45) Date of Patent: Oct. 3, 2017

(54) SEAT CUSHION EXTENSION APPARATUS FOR VEHICLE

(71) Applicants: Hyundai Motor Company, Seoul (KR); Kia Motors Corporation, Seoul (KR); Daewon Precision Industrial Co., Ltd., Ansan-si (KR)

(72) Inventors: Bong Ku Kim, Gunpo-si (KR); Sang Ho Kim, Incheon (KR); Young Bok Sung, Hwaseong-si (KR); Hyun Kyu Moon, Hwaseong-si (KR); Ju Hyun Kim, Anyang-si (KR); Da Eun Lee, Suwon-si (KR); Dong Il Lee, Ansan-si (KR); Woo Jae Jin, Incheon (KR)

(73) Assignees: Hyundai Motor Company, Seoul (KR); Kia Motors Corporation, Seoul (KR); Daewon Precision Industrial Co., Ltd., Ansan-si (KR)

( * ) Notice: Subject to any disclaimer, the term of this patent is extended or adjusted under 35 U.S.C. 154(b) by 37 days.

(21) Appl. No.: 14/966,499

(22) Filed: Dec. 11, 2015

(65) Prior Publication Data
US 2016/0339805 A1 Nov. 24, 2016

(30) Foreign Application Priority Data
May 20, 2015 (KR) ........................ 10-2015-0070410

(51) Int. Cl.
*A47C 3/00* (2006.01)
*A47C 7/14* (2006.01)
(Continued)

(52) U.S. Cl.
CPC ........... *B60N 2/0284* (2013.01); *B60N 2/442* (2013.01); *B60N 2/443* (2013.01); *B60N 2/4435* (2013.01);
(Continued)

(58) Field of Classification Search
CPC .... B60N 2/0284; B60N 2/4435; B60N 2/443; B60N 2/442; B60N 2/02; B60N 2/62; A47C 7/506; A47C 7/50
(Continued)

(56) References Cited

U.S. PATENT DOCUMENTS

| 4,370,000 A | * | 1/1983 | Kazaoka | .............. B60N 2/4492 |
| | | | | 297/284.9 |
| 5,366,272 A | * | 11/1994 | Lebrun | .................... B60N 2/62 |
| | | | | 297/284.11 |

(Continued)

FOREIGN PATENT DOCUMENTS

| JP | 10-19614 A | 1/1998 |
| JP | 11-278122 A | 10/1999 |

(Continued)

*Primary Examiner* — Chi Q Nguyen
(74) *Attorney, Agent, or Firm* — Morgan, Lewis & Bockius LLP (57) ABSTRACT

A seat cushion extension apparatus for a vehicle seat includes an extension unit slidable from a front end portion of a seat frame in a vehicle to a position disposed forwards of the front end portion of the seat frame, locking units for locking the extension unit with respect to the seat frame at a locking position, and allowing the extension unit to be slidable such that the extension unit protrudes forwards of the seat frame at a release position, and a lever for controlling the locking units between the locking position and the release position. The extension unit is supported by guide shafts to be movable forwards and rearwards in housings fixed to the seat frame. The guide shafts are locked in the housings at the locking position and are movable with respect to the seat frame at the release position.

9 Claims, 6 Drawing Sheets (51) Int. Cl.
*B60N 2/02* (2006.01)
*B60N 2/44* (2006.01)
*A47C 7/50* (2006.01)
*B60N 2/62* (2006.01)

(52) U.S. Cl.
CPC ............... *A47C 7/50* (2013.01); *A47C 7/506* (2013.01); *B60N 2/02* (2013.01); *B60N 2/62* (2013.01)

(58) Field of Classification Search
USPC .............. 297/284.11, 423.28, 452.48, 423.1, 297/423.19, 452.59, 337
See application file for complete search history.

(56) References Cited

U.S. PATENT DOCUMENTS

| | | | |
|---|---|---|---|
| 5,967,602 A * | 10/1999 | Ptak | B60R 7/043 224/275 |
| 6,398,307 B1 * | 6/2002 | Schmidt | B60N 2/0232 297/337 |
| 6,814,406 B2 * | 11/2004 | Ito | B60N 2/181 297/284.11 |
| 9,168,847 B2 * | 10/2015 | Copeland | B60N 2/02 |
| 2009/0039690 A1 * | 2/2009 | Simon | B60N 2/0224 297/344.1 |
| 2010/0031761 A1 * | 2/2010 | Daul | B60N 2/233 74/89.24 |
| 2012/0267928 A1 * | 10/2012 | Mankame | B60N 2/002 297/284.4 |
| 2015/0108816 A1 * | 4/2015 | Dry | B60N 2/62 297/423.19 |
| 2015/0305507 A1 * | 10/2015 | Besler | A47C 7/506 297/423.28 |
| 2016/0318426 A1 * | 11/2016 | Aita | B60N 2/3013 |

FOREIGN PATENT DOCUMENTS

| | | |
|---|---|---|
| KR | 1997-0026336 A | 6/1997 |
| KR | 10-2011-0013664 A | 2/2011 |
| KR | 10-2011-0013665 A | 2/2011 |
| KR | 10-2011-0016566 A | 2/2011 |
| KR | 10-2011-0020965 A | 3/2011 |
| KR | 10-1470185 B1 | 12/2014 |

* cited by examiner

SEAT CUSHION EXTENSION APPARATUS FOR VEHICLE

CROSS-REFERENCE TO RELATED APPLICATION

The present application claims priority of Korean Patent Application Number 10-2015-0070410 filed May 20, 2015, the entire contents of which application are incorporated herein for all purposes by this reference.

BACKGROUND

Technical Field

The present disclosure relates to a seat cushion extension apparatus for a vehicle seat. More particularly, it relates to a seat cushion extension apparatus for a vehicle seat, which has an improved structure capable of conveniently moving a portion of a front section of a seat cushion in a forward direction, to adjust the seat cushion to the contour of an occupant's body.

Background Art

Generally, a vehicle seat includes a seat cushion for supporting the back of the lower body of an occupant, to provide comfortable sitting to the occupant when the occupant is seated on the seat cushion, a seatback for supporting the upper body of the occupant, and a headrest for supporting the head and neck portions of the occupant.

Meanwhile, the seat cushion has a fixed size and, as such, may be incapable of providing optimal convenience to the occupant in that the occupant may have various personal body characteristics.

For example, in the case of a driver who has short legs, there may be a problem in that the legs of the driver cannot reach a pedal or driving may be inconvenient even when the seat cushion is moved forwards.

In order to solve such a problem, there have been proposed a cushion extension structure in which a portion of a front section of a seat is formed as a separate element, and is mounted to the seat to be movable with respect to the seat, using a power motor and a lead screw, and a locking structure for locking the cushion extension structure in a manually adjustable manner, using a gear member and a stopper.

An example of the structure capable of moving a portion of the front section of the seat with respect to the seat is disclosed in Korean Registered Patent No. 10-1470185 (registered on Dec. 1, 2014). This patent discloses a seat cushion extension pad device for a vehicle seat including a lower support frame fixed, at a lower portion thereof to a vehicle frame, a rotating arm pivotally coupled, at one end thereof, to a rear portion of the lower support frame at one side of the lower support frame while being coupled, at the other end thereof, to a lower portion of a seat cushion extension pad, and a hinge bracket pivotally coupled to a front portion of the lower support frame at one side of the lower support frame, to guide rotation of the seat cushion extension pad when the seat cushion extension pad moves.

Figure 1:
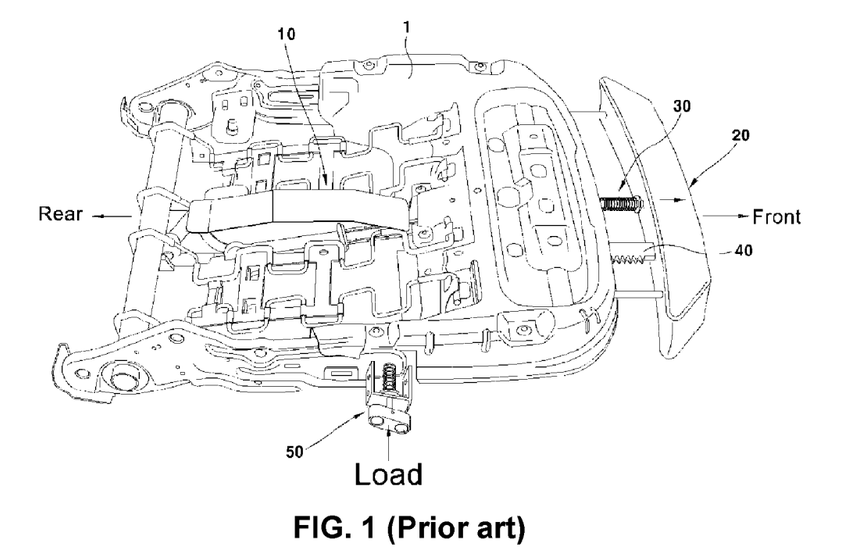
FIG. 1 is a perspective view schematically illustrating a conventional seat cushion extension structure for a vehicle seat.

As another example, a seat cushion extension apparatus is disclosed in Korean Registered Patent No. 10-1506351 (registered on Mar. 20, 2015). As shown in FIG. 1, the disclosed seat cushion extension apparatus includes an actuating bracket 10 pivotally coupled to a cushion frame 1, to be moved forwards by load of a seat cushion occupant, an extension frame 20 connected to the cushion frame 1, to be movable in a forward direction from a front surface of the cushion frame 1 such that the extension frame 10 protrudes from the cushion frame 1, a power transmission unit 30 installed to connect the actuating bracket 10 and the extension frame 20, and to provide force to move the extension frame 20 in the forward direction when the power transmission unit 30 moves forwards in link with the actuating bracket 10 and force to return the extension frame 20 in a rearward direction, a locking unit 40 provided at the cushion frame 1 and extension frame 20, to lock forward and rearward movement of the extension frame 20, and a lever unit 50 provided at the cushion frame 1, to be connected to the locking unit 40 such that the lever unit 50 operates when depressed in a one touch fashion, to operate the locking unit 40.

In the above-mentioned conventional cushion extension structure, however, there are problems of increase in cost, increase in weight, and motor noise due to use of the power motor. Meanwhile, in the conventional manual extension apparatus, an improvement in structure in consideration of marketability of the extension apparatus is required because noise is generated due to excessive clearances among constituent elements caused by low accuracy of operation.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with the prior art and/or other problems The present disclosure relates to a seat cushion extension apparatus for a vehicle seat, which includes an extension unit mounted to be conveniently movable in a manual fashion without using a power motor.

In one aspect, the present invention provides a seat cushion extension apparatus for a vehicle seat including an extension unit disposed to be slidable from a front end portion of a seat frame in a vehicle to a position disposed forwards of the front end portion of the seat frame, locking units for locking the extension unit with respect to the seat frame at a locking position, and allowing the extension unit to be slidable such that the extension unit protrudes forwards of the seat frame at a release position, and a lever for controlling the locking units between the locking position and the release position, wherein the extension unit is supported by guide shafts to be movable forwards and rearwards in housings fixed to the seat frame at opposite sides of the extension unit, and the guide shafts are locked in the housings at the locking position by the locking units and are movable with respect to the seat frame at the release position.

In a preferred embodiment, each of the guide shafts may be prevented from moving due to friction of at least one frictional spring disposed to contact an outer circumferential surface of the guide shaft at the locking position of a corresponding one of the locking units, and may be movable at the release position of the corresponding locking unit in accordance with an increase in diameter of the frictional spring.

In another preferred embodiment, each of the locking units may include two bushes respectively fixed to front and rear ends of a corresponding one of the housings fixed to a lower surface of the seat frame, to guide forward and rearward sliding movement of a corresponding one of the guide shafts, stoppers respectively disposed adjacent to inner ends of the bushes, a pair of frictional springs disposed adjacent to respective inner ends of the stoppers while being spaced apart from each other, to contact an outer circumferential surface of the corresponding one of the guide shafts, and a release lever for adjusting diameters of the frictional springs, to lock or release the corresponding one of the guide shafts, which is disposed to extend through the frictional springs.

In still another preferred embodiment, each of the stoppers may be formed, at an inner end thereof, with a protrusion to be connected to one end of the corresponding frictional spring disposed adjacent to an inner end of the stopper while protruding outwards in a radial direction of the frictional spring.

In yet another preferred embodiment, each of the frictional springs may be connected to the release lever at an end of the frictional spring disposed opposite to the corresponding stopper, and the frictional spring may be increased in diameter when the release lever rotates to the release position, thereby allowing the corresponding guide shaft to move freely, and the frictional spring may be reduced in diameter when the release lever rotates in an opposite direction to the locking position, to come into close contact with the outer circumferential surface of the guide shaft disposed to extend through the frictional springs, thereby preventing the guide shaft from moving.

In still yet another preferred embodiment, the release lever may include a cylindrical body, through which the guide shaft extends, and a lever portion protruding downwards from the body, and the lever portion may be disposed to extend through an opening formed at a bottom portion of a corresponding one of the housings such that the lever portion protrudes downwards from the housing.

In a further preferred embodiment, the lever, which operates the locking units to move from the locking position to the release position, may be pivotally mounted to a lower surface of the front end portion of the seat frame, and may operate the release levers of the locking units, using a pair of cables connected to the lever.

In another further preferred embodiment, each of the cables may be disposed to extend through a protective sheath, and is connected, at one end thereof, to the lever of the extension unit, while being connected, at the other end thereof, to the lever portion of a corresponding one of the release levers.

In still another further preferred embodiment, each of the cables may be slidably disposed in a protective sheath, and the protective sheath may be fixed, at one end thereof, to the front end portion of the seat frame while being fixed, at the other end thereof, to a position adjacent to a corresponding one of the release levers.

Other aspects and preferred embodiments of the invention will be discussed hereinafter.

It is understood that the terms "vehicle", "vehicular" and other similar term as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention will be discussed hereinafter.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which are within the spirit and scope of the invention as defined by the appended claims.

Figure 2:
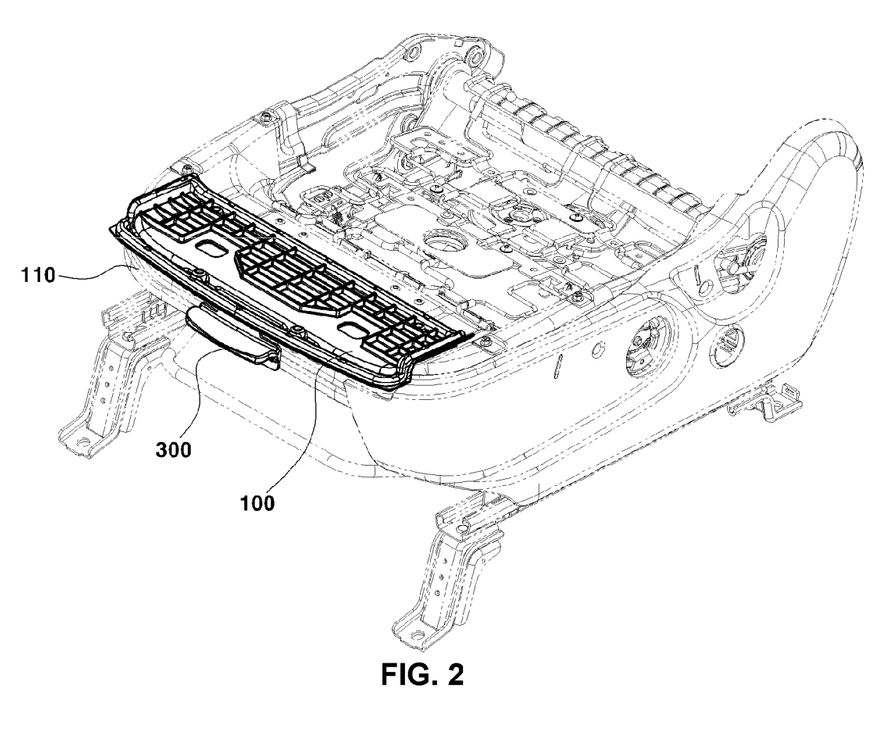
FIG. 2 is a perspective view schematically illustrating a state in which an extension unit is mounted to a seat, to which a seat cushion extension structure is applied according to an embodiment of the present invention.
Figure 3:
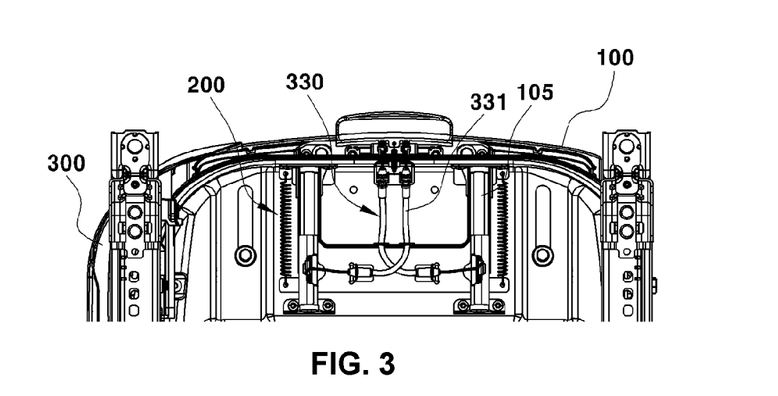
FIG. 3 is a bottom view schematically illustrating the seat cushion extension structure of FIG. 2.

Referring to FIGS. 2 and 3, a seat cushion extension apparatus for a vehicle seat according to an embodiment of the present invention is illustrated. As illustrated in the drawings, the seat cushion extension apparatus includes an extension unit 100 mounted to a seat frame 110 of a vehicle such that the extension unit 100 can protrude from a front end portion of a seat, locking units 200 for locking the extension unit 100 with respect to the seat frame 110 at a locking position while allowing the extension unit 100 to protrude forwards of the seat frame 110 at a release position, and a lever 300 for controlling the locking units 200 to move between the locking position and the release position. The extension unit 100 is shown under the condition that a seat cushion is removed, for simplification of illustration.

In accordance with the illustrated embodiment of the present invention, the extension unit 100 is disposed on an upper surface of the front end portion of the seat frame 110, to be slidable from the front end portion of the seat frame 110 to a position disposed forwards of the front end portion of the seat frame 110. For simplification of illustration, the extension unit 100 is shown under the condition that the seat cushion is removed.

The extension unit 100 is connected to front ends of guide shafts 105 respectively disposed in housings 210 fixed to the seat frame 110 at opposite sides of a lower surface of the extension unit 100, to be movable forwards and rearwards. The front end of each guide shaft 105 protrudes through the front end portion of the seat frame 110. A rear end of each guide shaft 105 is fixed to the lower surface of the extension unit 100.

Figure 4A:
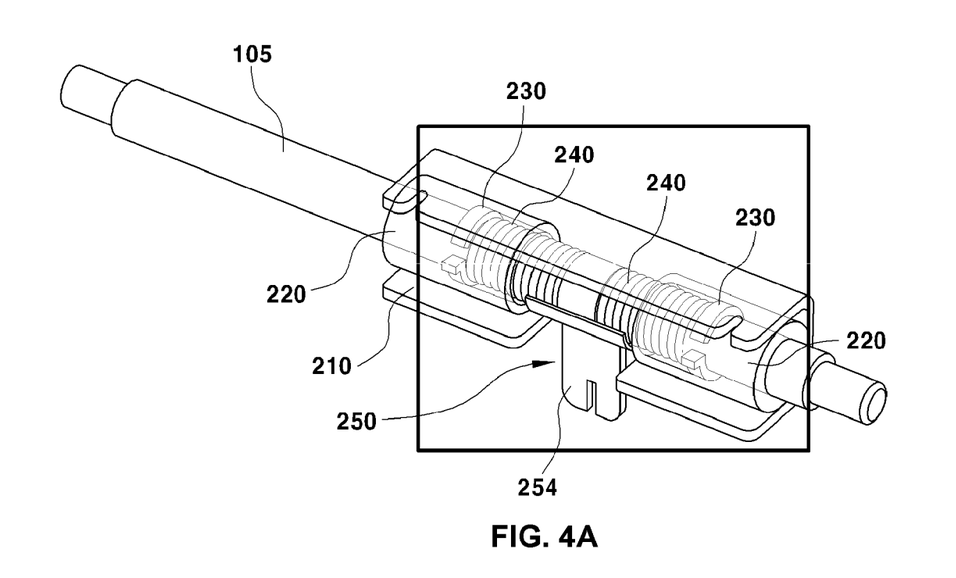
FIG. 4A is a perspective view illustrating a state in which a locking unit is mounted to a guide shaft to movably support the extension unit illustrated in FIG. 3.
Figure 4B:
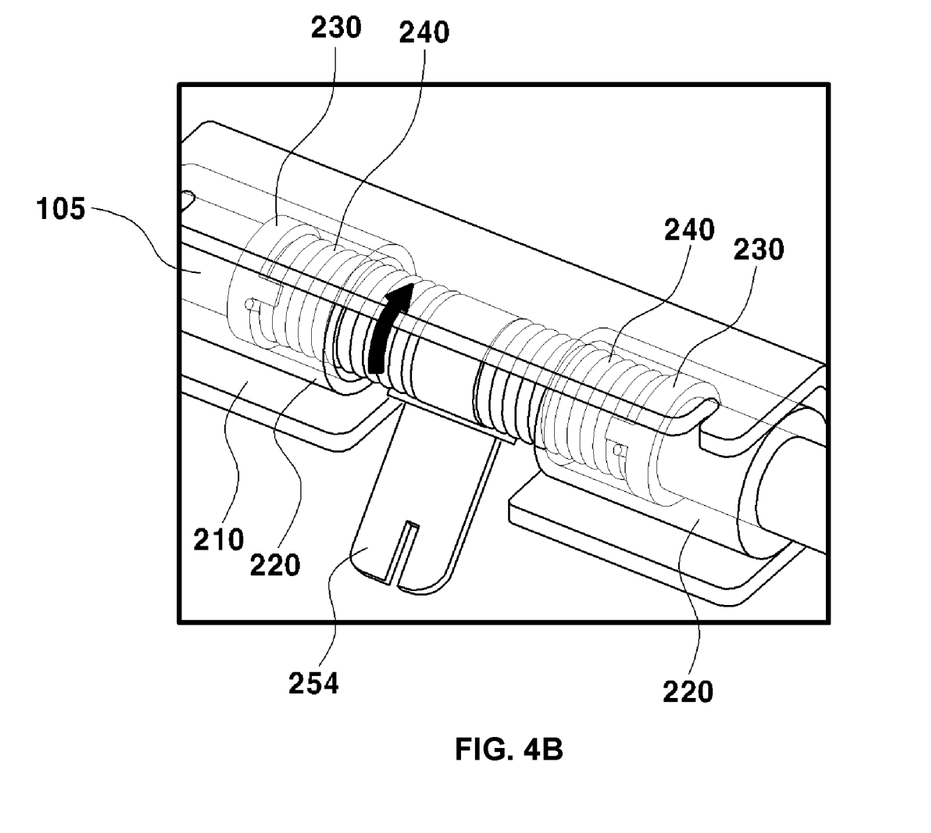
FIG. 4B is a partially enlarged view of FIG. 4A

As illustrated in FIGS. 3, 4A and 4B, each locking unit 200 includes two bushes 220 respectively fixed to front and rear ends of the corresponding housing 210 fixed to the lower surface of the seat frame 110, to guide forward and rearward sliding movement of the corresponding guide shaft 105, stoppers 230 respectively disposed adjacent to inner ends of the bushes 220, and a pair of frictional springs 240 disposed adjacent to respective inner ends of the stoppers 230 while being spaced apart from each other, to contact an outer circumferential surface of the guide shaft 105. The locking unit 200 further includes a release lever 250 for adjusting diameters of the frictional springs 240, to lock or release the guide shaft 105, which is disposed to extend through the frictional springs 240.

Each stopper 230 is formed, at an inner end thereof, with a protrusion 231 to be connected to one end 242 of the corresponding frictional spring 240 disposed adjacent to the stopper while protruding outwards in a radial direction of the frictional spring 240.

Each frictional spring 240 is also connected, at the other end 243 thereof, to the release lever 250. Accordingly, at a release position where the release lever 250 rotates clockwise, each frictional spring 240 is increased in diameter and, as such, the guide shaft 105 is freely movable. On the other hand, at a locking position where the release lever 250 rotates counterclockwise, each frictional spring 240 is reduced in diameter and, as such, comes into close contact with the surface of the guide shaft 105, thereby preventing the guide shaft 105 from moving. It may be easily appreciated that the above-described rotational directions of the release lever 250 are reversed when viewed at an opposite side of the guide shaft 105.

Each frictional spring 240 is preferably a torsion spring, the diameter of which is increased or reduced in accordance with relative rotation of opposite ends of the spring. Initially, each frictional spring 240 is preferably in a reduced diameter state.

Figure 5:
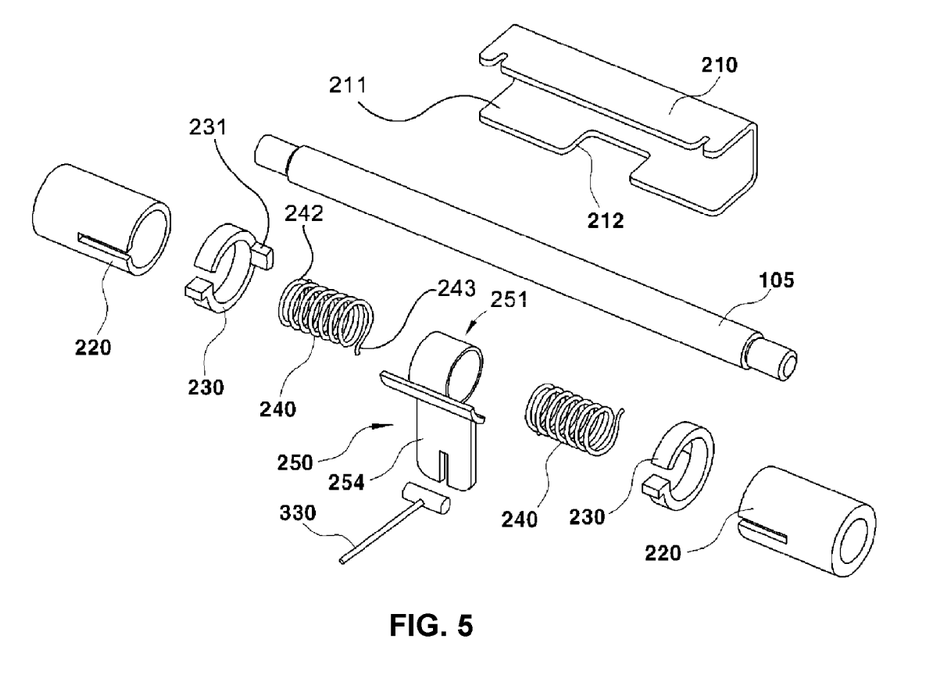
FIG. 5 is an exploded perspective view of the guide shaft and locking unit illustrated in FIG. 4A.

The release lever 250 includes a cylindrical body 251, through which the guide shaft 105 extends, and a lever portion 254 protruding downwards from the body 251. The lever portion 254 is disposed to extend through an opening 212 formed at a bottom portion 211 of the housing 210 and, as such, protrudes downwards from the housing 210.

As illustrated in FIGS. 2 and 3, the lever 300, which operates the locking units 200 to move from the locking position to the release position, is pivotally mounted to the lower surface of the front end portion of the seat frame 110. In detail, the lever 300 operates the release levers 250 of the locking units 200 provided at opposite sides of the lower surface of the extension unit 100, using a pair of cables 330 connected thereto.

Each cable 330 is slidably disposed in a protective sheath 331. The protective sheath 331 is fixed, at one end thereof, to the front end portion of the seat frame 110 while being fixed, at the other end thereof, to a position adjacent to the corresponding release lever 250. Meanwhile, each cable 330 extends through the corresponding protective sheath 331, and is connected, at one end thereof, to the lever 300 while being connected, at the other end thereof, to the lever portion 254 of the corresponding release lever 250.

Hereinafter, adjustment of the extension unit according to the illustrated embodiment of the present invention will be described with reference to FIGS. 5 to 9.

Figure 6:
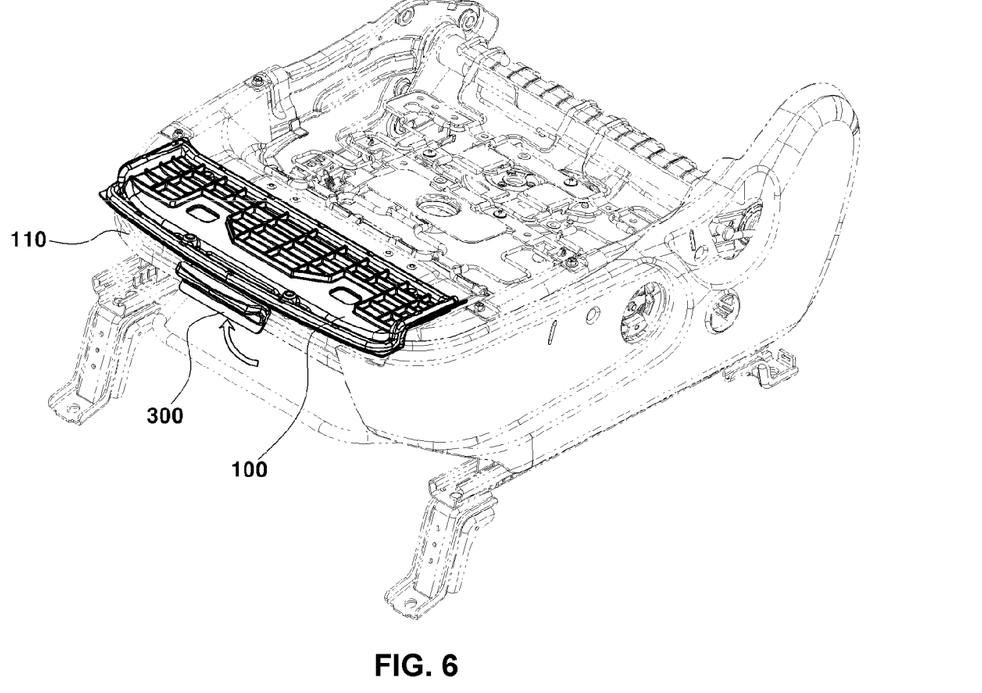
FIG. 6 is a perspective view illustrating release operation of the locking device in FIG. 3.
Figure 7:
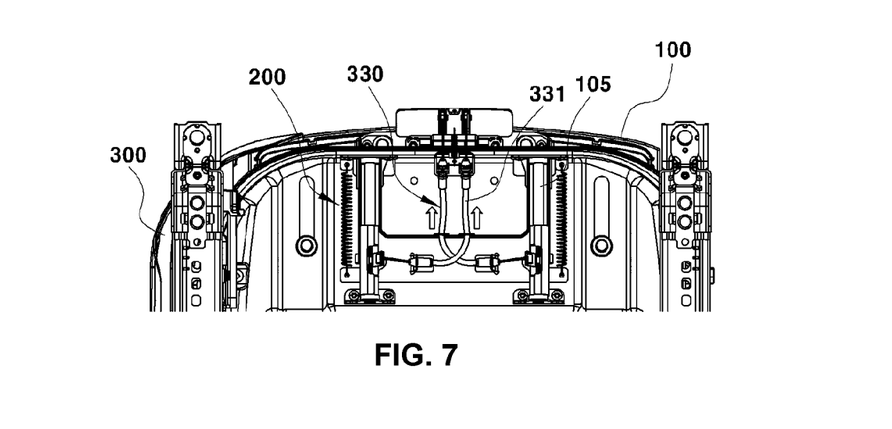
FIG. 7 is a bottom view illustrating release operation of the locking device in FIG. 3.

When the driver pivots the lever 300 upwards from an initial position illustrated in FIGS. 2 and 3, as illustrated in FIGS. 6 and 7, the ends of the two cables 330 connected to the lever 300 are drawn and, as such, the other ends of the cables 330 are pulled. Accordingly, the release levers 250 of the locking devices 200 respectively connected to the other ends of the cables 330 are pulled inwards, as illustrated in FIG. 6, and, as such, rotate in a release direction.

As a result, each release lever 250 pivots from the initial locking position where the corresponding frictional springs 240 are in close contact with the outer circumferential surface of the corresponding guide shaft 105, to prevent movement of the guide shaft 105, to the release position (cf. FIG. 6). Accordingly, the diameters of the frictional springs 240 are increased to allow the guide shaft 105 to move forwards and, as such, the extension unit 100 is moved forwards as illustrated in FIG. 7. Thus, the extension unit 100 is adjusted to move to a position suitable for a driver having a short body.

Figure 8:
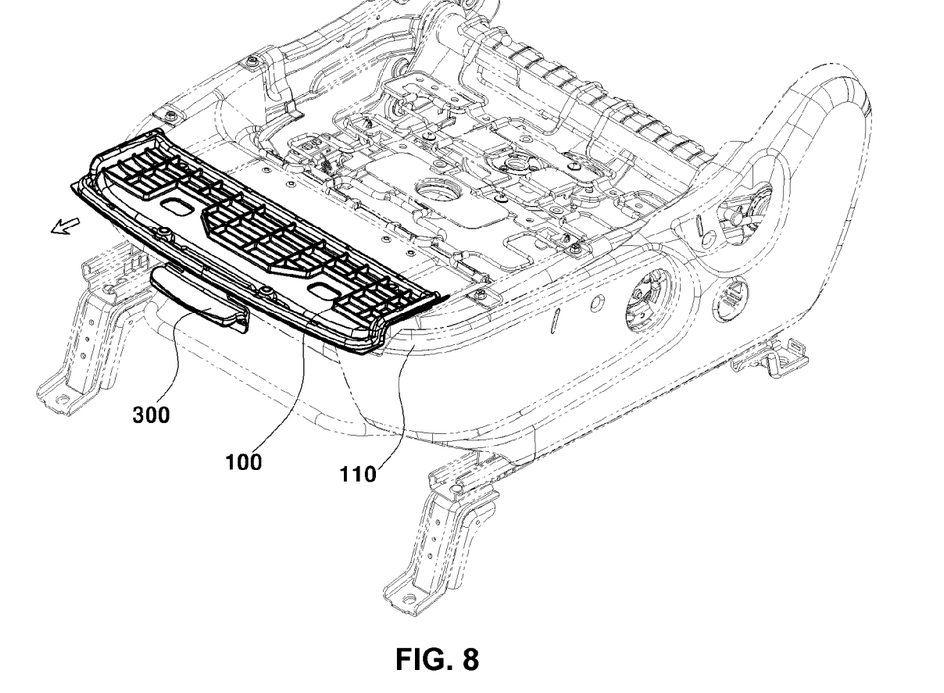
FIG. 8 is a bottom view illustrating a protruding state of the extension unit locking-released in FIG. 3.
Figure 9:
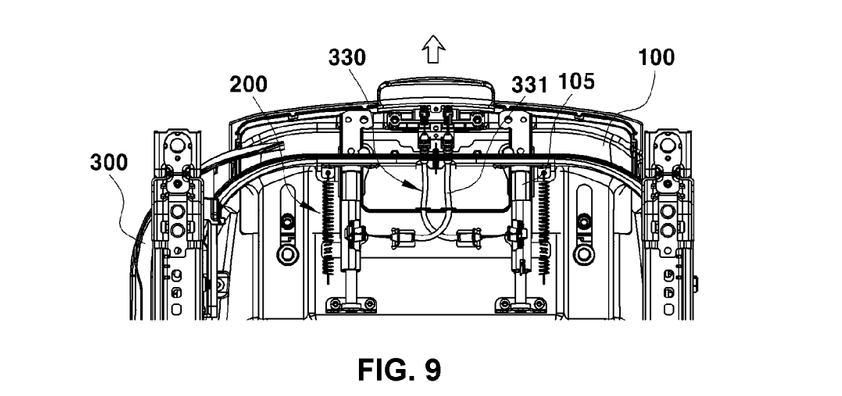
FIG. 9 is a bottom view corresponding to FIG. 8.

When the driver releases the lever 300 after adjusting the position of the extension unit 100 to be suitable for the driver by drawing the extension unit 100, as illustrated in FIGS. 8 and 9, the frictional springs 240 disposed around the corresponding guide shaft 105 are reduced in diameter from the diameter increased state to the initial state, namely, the reduced diameter state, and, as such, come into contact with the outer circumferential surface of the guide shaft 105. As a result, the guide shaft 105 is locked at the adjusted position of the extension unit 100.

As described above, the extension unit according to the illustrated embodiment of the present invention may have a very simple structure because no gear is used, differently than conventional cases. Furthermore, it may be possible to achieve a reduction in manufacturing costs because no motor is used. In addition, there may be no occasion of mechanical trouble and, as such, an enhancement in durability may be achieved.

As apparent from the above description, the vehicle seat cushion extension structure according to the present invention achieves an enhancement in convenience because the extension structure is mounted to the seat frame and is conveniently adjustable to conform to the contour of the occupant's body. Movement of the extension unit is controllable by frictional forces of the springs applied to the guide shafts and, as such, it may be possible to achieve cost reduction and weight reduction, as compared to conventional seat cushion extension structures using a motor. In addition, there are effects of no generation of noise and convenient and accurate seat cushion adjustment.

For convenience in explanation and accurate definition in the appended claims, the terms "upper" or "lower", "front" or "rear", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat cushion extension apparatus for a vehicle seat comprising:
    an extension unit disposed to be slidable from a front end portion of a seat frame in a vehicle to a position disposed forwards of the front end portion of the seat frame;
    locking units for locking the extension unit with respect to the seat frame at a locking position, and allowing the extension unit to be slidable such that the extension unit protrudes forwards of the seat frame at a release position; and
    a lever for controlling the locking units between the locking position and the release position,
    wherein the extension unit is supported by guide shafts to be movable forwards and rearwards in housings fixed to the seat frame at opposite sides of the extension unit, and the guide shafts are locked in the housings at the locking position by the locking units and are movable with respect to the seat frame at the release position.

2. The seat cushion extension apparatus of claim 1, wherein each of the guide shafts is prevented from moving due to friction of at least one frictional spring disposed to contact an outer circumferential surface of the guide shaft at the locking position of a corresponding one of the locking units, and is movable at the release position of the corresponding locking unit in accordance with an increase in diameter of the frictional spring.

3. The seat cushion extension apparatus of claim 1, wherein each of the locking units comprises two bushes respectively fixed to front and rear ends of a corresponding one of the housings fixed to a lower surface of the seat frame, to guide forward and rearward sliding movement of a corresponding one of the guide shafts, stoppers respectively disposed adjacent to inner ends of the bushes, a pair of frictional springs disposed adjacent to respective inner ends of the stoppers while being spaced apart from each other, to contact an outer circumferential surface of the corresponding one of the guide shafts, and a release lever for adjusting diameters of the frictional springs, to lock or release the corresponding one of the guide shafts, which is disposed to extend through the frictional springs.

4. The seat cushion extension apparatus of claim 3, wherein each of the stoppers is formed, at an inner end thereof, with a protrusion to be connected to one end of the corresponding frictional spring disposed adjacent to an inner end of the stopper while protruding outwards in a radial direction of the frictional spring.

5. The seat cushion extension apparatus of claim 3, wherein each of the frictional springs is connected to the release lever at an end of the frictional spring disposed opposite to the corresponding stopper, and the frictional spring is increased in diameter when the release lever rotates to the release position, thereby allowing the corresponding guide shaft to move freely, and the frictional spring is reduced in diameter when the release lever rotates in an opposite direction to the locking position, to come into close contact with the outer circumferential surface of the guide shaft disposed to extend through the frictional springs, thereby preventing the guide shaft from moving.

6. The seat cushion extension apparatus of claim 5, wherein the release lever comprises a cylindrical body, through which the corresponding guide shaft extends, and a lever portion protruding downwards from the body, and the lever portion is disposed to extend through an opening formed at a bottom portion of a corresponding one of the housings such that the lever portion protrudes downwards from the housing.

7. The seat cushion extension apparatus of claim 5, wherein the lever, which operates the locking units to move from the locking position to the release position, is pivotally mounted to a lower surface of the front end portion of the seat frame, and operates the release lever of the locking units, using a pair of cables connected to the lever.

8. The seat cushion extension apparatus of claim 7, wherein each of the cables is disposed to extend through a protective sheath, and is connected, at one end thereof, to the lever of the extension unit, while being connected, at the other end thereof, to the lever portion of the release lever.

9. The seat cushion extension apparatus of claim 7, wherein each of the cables is slidably disposed in a protective sheath, and the protective sheath is fixed, at one end thereof, to the front end portion of the seat frame while being fixed, at the other end thereof, to a position adjacent to the release lever.

* * * * *